United States Patent Office 3,568,314
Patented Mar. 9, 1971

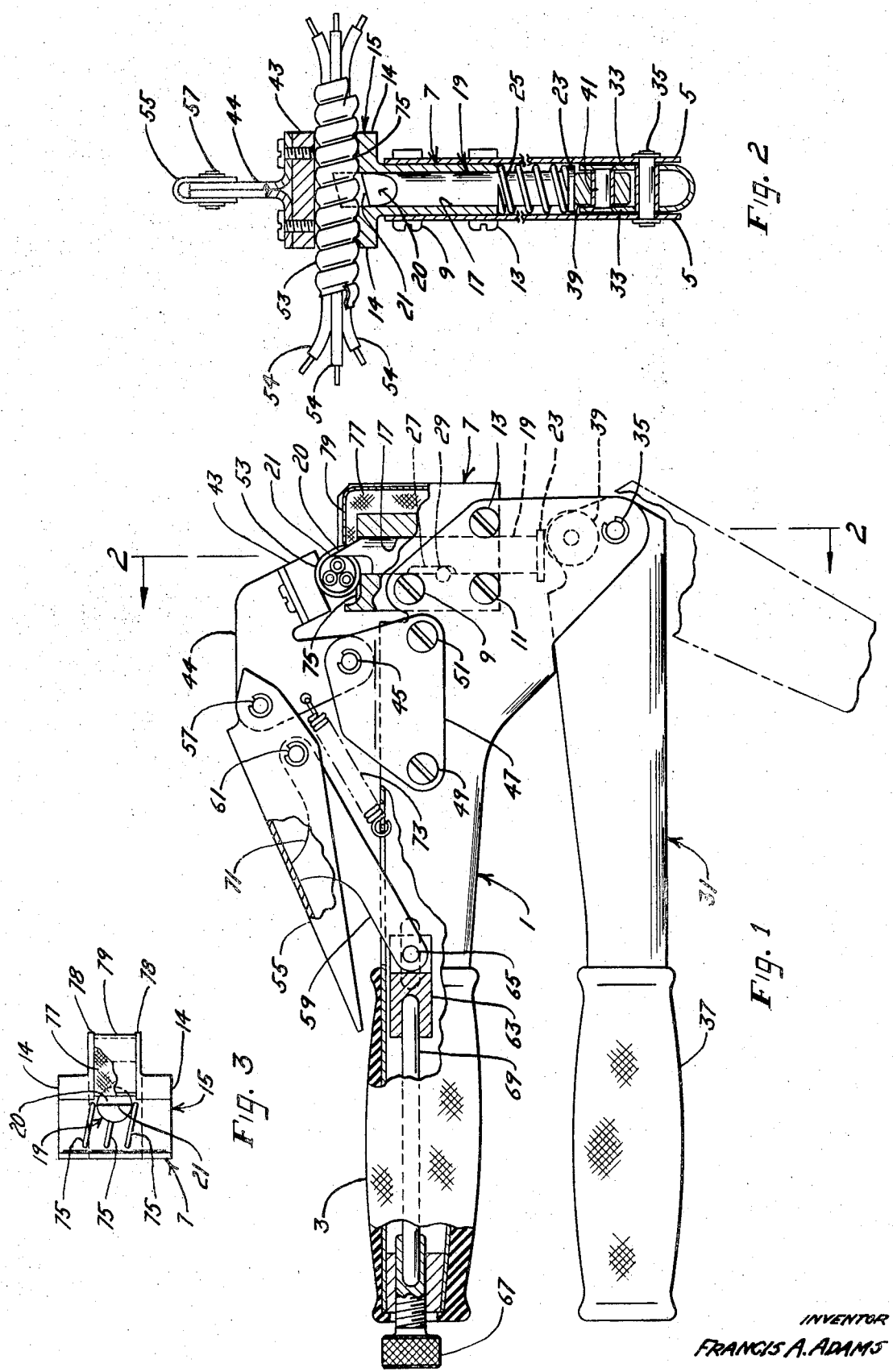

3,568,314
TOOL FOR SEVERING THE SPIRALLY WOUND ARMOR OF AN ELECTRICAL CABLE
Francis Allen Adams, 88 Manchester Ave., North Haledon, N.J. 07508
Filed Apr. 3, 1970, Ser. No. 25,428
Int. Cl. B26b 27/00
U.S. Cl. 30—90.2                     13 Claims

ABSTRACT OF THE DISCLOSURE

The tool has a pair of jaws for clamping a length of cable therebetween, a cutting element having a cutting edge, and cam means for moving the cutting element in a bore in the tool so that the cutting edge moves in a plane substantially tangent to the inner periphery of the armor into engagement therewith to make a paring cut in the armor for severing a turn thereof. This arrangement avoids damaging the insulation of the electrical conductors and bends the severed turn outwardly to facilitate removal of the severed portion of the armor from the insulated conductors.

---

The invention relates to special purpose tools and more particularly to such tools for severing the spirally wound armor of electrical cable known as BX cable.

Heretofore, BX cable was cut with a hack saw while held in the hand or clamped in a vise or special tool. This of course was time consuming and the insulation on the electrical conductors was frequently damaged. Special plier-like tools were developed for cutting BX cable, but these tools lacked sufficient mechanical advantage so that cutting BX cable was a burdensome operation. Also, the cutting edge of these tools moved in a plane passing through the axis of the cable and perpendicular to the armor. When the cutting edge engaged the armor, the armor collapsed before the cutting edge penetrated the armor. If the cutting element did succeed in severing the armor, because the armor was pushed inwardly, it was difficult to remove the severed piece of armor from the insulated electrical conductors. When the tool became dull this condition was aggravated. Besides, it was difficult to control the depth of cut and the tool frequently damaged the insulation on the electrical conductors.

The present invention contemplates a tool for severing the spirally wound armor of an electrical cable, comprising means for clamping a length of cable, a cutting element having a cutting edge, and means for moving the cutting edge in a plane substantially tangent to the inner periphery of the armor into engagement therewith and making a paring cut in the armor for severing a turn thereof.

One object of the present invention is to provide a tool which efficiently severs the spirally wound armor of an electrical cable.

Another object of the invention is to move the cutting edge of the cutting element in a plane substantially tangent to the inner periphery of the armor into engagement therewith and make a paring cut in the armor for severing a turn thereof.

Another object is to bend the end of the severed turn outwardly to facilitate removal of the severed portion of the armor from the insulated electrical conductors.

Another object is to sever the armor without damage to the insulation on the electrical conductors.

Another object is to provide a single tool which will sever armored cable of any diameter by making a paring cut through a turn of the armor.

Another object is to clamp the cable between a pair of jaws having guide means for positioning the cable so the cutting element completely severs one turn of the armor.

Another object is to wipe and lubricate the cutting edge of the tool during each cutting operation to prevent metal chips from accumulating on the cutting edge and to facilitate the cutting operation.

Another object is to provide a tool of the kind described with sufficient mechanical advantage to cut BX cable without appreciable operator effort.

The foregoing and other objects and advantages of the invention will appear more fully hereinafter from a consideration of the detailed description which follows, taken together with the accompanying drawings wherein one embodiment of the invention is illustrated by way of example.

In the drawing:

FIG. 1 is a side elevation partly in section of a tool constructed according to the invention for severing armored cable, FIG. 2 is a transverse vertical section taken on the line 2—2 of FIG. 1, and FIG. 3 is a top view of one of the jaws showing details of construction.

Referring to the drawing, the novel tool shown therein and constructed according to the invention comprises a hollow frame 1 having a handle 3 at one end. The opposite end of the frame is angularly disposed and is bifurcated as shown at 5, 5 in FIG. 2. A block 7 is received between the bifurcations 5, 5 and is attached to frame 1 by screws 9, 11, 13 or by other suitable means. Block 7 has oppositely disposed flanges 14 extending transversely thereof and forming a jaw 15. A bore 17 extends through block 7 and jaw 15 and receives a cutting element 19 for reciprocating movement therein. One end of the cutting element 19 adjacent jaw 15 is beveled at 20 to form a cutting edge 21 which is inclined to the armor and sequentially cuts the armor as the cutting element moves axially towards the armor. Cutting edge 21 is of suitable length for completely severing at least one turn of the armor. The opposite end of cutting element 19 terminates in a flange 23. A coil spring 25 encircles cutting element 19 and one end of the spring engages flange 23 and the other end engages block 7. Spring 25 is arranged to resiliently urge cutting element 19 inwardly of the bore away from jaw 15.

Cutting element 19 is moved in the opposite direction against the force of spring 25 by a hollow lever 31 pivoted to elements 5, 5 of frame 1 by a pin 35 or other suitable means. A handle 37 is formed at the opposite end of lever 31. A roller cam 39 is rotatably mounted between parallel walls 33, 33 of lever 31 by a pintle 41 and engages flange 23 on cutting element 19. Movement of lever 31 towards frame 1 moves cutting element 19 in bore 17 in opposition to spring 25. Cutting element 19 has a circumferential portion cut away to provide a flat surface 27 for accommodating a pin 29 extending through block 7 to prevent rotation of cutting element 19 in bore 17 and to limit movement of the cutting element.

A second jaw 43 is secured to a bracket 44 which pivots on a pin 45 secured to a pair of brackets 47 attached to frame 1 by screws 49, 51. Jaw 43 cooperates with fixed jaw 15 to securely hold an electrical cable 53, such as BX cable, whose armor is to be severed by the tool so the severed portion of the armor can be removed from the insulated electrical conductors 54.

An operating lever 55 is pivotally connected at one end by a pin 57 to bracket 44. A locking lever 59 is pivotally connected at one end to operating lever 55 by a pin 61 and at the other end to a block 63 by a pin 65. Block 63 is positioned in handle 3 and is adjusted by a knurled screw 67 through a rod 69 connected to block 63. The opening between jaws 15 and 43 can be adjusted to the size of cable 53 by rotating knurled screw 67 and positioning block 63 so that the jaws securely clamp the cable therebetween when operating lever 55 is in the position shown in FIG. 1 in engagement with a stop 71 on locking lever 59. In this position, pin 61 passes dead center, that is, the line between pins 57 and 65. A spring 73 separates jaws 15 and 43 when operating lever 55 is released.

As shown in FIG. 3, jaw 15 has guide elements 75 for accurately positioning the cable with respect to cutting edge 21 so that at least one turn of the armor is completely severed. Also, jaws 15 and 43 are shaped and arranged to clamp cable of any size in a position so that cutting edge 21 moves in a plane substantially tangent to the inner periphery of the armor for making a paring cut in the armor. The severed turn is bent outwardly by the bevelled portion 20 of cutting element 19 as shown in FIG. 1 to facilitate removal of the severed portion of the armor from the insulated electrical conductors.

A wick 77 of oil soaked felt or other suitable material is positioned between a pair of flanges 78 and between flanges 14 on the outer face of block 7 as shown in FIG. 3. One end of the wick is urged by angularly shaped ribbon spring 79 into engagement with the bevelled portion of cutting element 19 to wipe cutting edge 21 during each cutting operation. This arrangement lubricates the cutting edge as it moves towards the cable and wipes it clean of chips or other foreign matter as the cutting edge 21 moves away from the cable.

The tool operates as follows: Lever 31 is pivoted away from frame 1 to permit spring 25 to retract cutting element 19 into bore 17 as shown in solid lines in FIG. 2. Operating lever 55 also is pivoted away from frame 1 and jaw 43 is adjusted by knurled screw 67 through rod 69 and locking lever 59 to a position to receive a length of cable 53 between jaws 15, 43. The cable is positioned between the jaws so the flutes in the cable register with guide elements 75 on jaw 15. Operating lever 55 is then moved toward frame 1 to the position shown in FIG. 1 with stop 71 on locking lever 59 engaging the inside surface of operating lever 55. With the arrangement described jaws 15, 43 clamp armored cable 53 therebetween in position for a cutting operation. Lever 31 is then pivoted toward frame 1 and roller 39 engages flange 23 and urges cutting element 19 towards the cable. As shown in FIG. 1, cutting edge 21 of cutting element 19 moves in a plane substantially tangent to the inner periphery of the armor and makes a paring cut as it severs a turn of the armor. Cutting edge 21 engages the armor at a point where the armor is rigid because the wall of the armor is substantially parallel to the direction of movement of the cutting edge and the point on the cutting edge readily penetrates the armor without collapsing the armor. As the cutting edge 21 severs a turn of the armor, the bevelled portion 20 bends the end of the severed turn outwardly. Also, the cutting edge cannot damage the insulation on the electrical conductors because the conductors are positioned to the side of the cutting edge.

Jaw 43 is released by moving lever 55 away from frame 1 so the cable can be removed from between the jaws. The severed portion of the cable is easily removed from insulated conductors 54 by rotating the severed portion through a small angle and sliding it from the insulated conductors.

A tool constructed according to the invention is efficient in operation and severs the armor without danger of damaging the insulation on the electrical conductors. The cable is clamped between jaws which are adjustable for receiving cable of any size and automatically position the cable so the cutting edge will completely sever one turn of the armor. The paring cut on the armor bends the end of the severed turn outwardly so that the severed portion of the armor is readily separated from the cable. During a cutting operation the cutting edge is lubricated and wiped clean of foreign matter to facilitate the cutting operation. The tool provides enough mechanical advantage to enable the operator to easily cut the armor of the cable.

What is claimed is:

1. A tool for severing the spirally wound armor of an electrical cable, comprising means for clamping a length of cable and for positioning the inner periphery of the armor substantially tangential to a plane, a cutting element having a cutting edge, and means for moving the cutting edge in said plane into engagement with said armor and making a paring cut therein for severing a turn thereof.

2. A tool as described in claim 1 in which the cutting element has a bevelled portion adjacent the cutting edge which engages the severed turn of the armor and bends the severed turn outwardly.

3. A tool as described in claim 1 in which the means for clamping the cable is a pair of jaws having guide means for positioning the cable relative to the cutting edge of the cutting element so that the cutting element completely severs one turn of the armor.

4. A tool of the kind described in claim 1 in which the cutting edge is longer than the width of one turn of the armor, and means for moving the cutting element axially towards the cable for severing a turn of the armor.

5. A tool as described in claim 4 in which the cutting edge is inclined to the armor and sequentially cuts the armor as the cutting element moves axially towards the cable.

6. A tool of the kind described in claim 4 in which the cutting element reciprocates in a bore in the tool and is urged away from the cable by resilient means.

7. A tool as described in claim 6 in which the means for moving the cutting edge towards the cable is a cam actuated by a lever.

8. A tool as described in claim 6 in which the means for clamping the cable is a pair of jaws and one of the jaws has an aperture adjacent the bore for receiving the cutting element.

9. A tool as described in claim 1 having means for automatically lubricating the cutting edge of the cutting element with each operation of the cutting element.

10. A tool as described in claim 1 having means for moving the cutting element axially towards the cable, and means associated with the cutting element for applying a film of lubricant on the cutting edge as the cutting element moves toward the cable.

11. A tool as described in claim 10 in which the means for applying a film of lubricant is a wick impregnated with oil which rubs the cutting edge.

12. A tool as described in claim 1 in which the means for clamping the cable is a pair of jaws and the tool includes means for adjusting the jaws to receive cables of different sizes and means for locking the jaws.

13. A tool as described in claim 12 in which the means for locking the jaws is a lever operated over center mechanism.

References Cited

UNITED STATES PATENTS

| | | | |
|---|---|---|---|
| 1,670,250 | 5/1928 | Froschhauser | 30—90.2 |
| 1,765,165 | 6/1930 | Krosta | 30—90.2 |
| 1,851,985 | 4/1932 | Roe | 30—90.2 |

OTHELL M. SIMPSON, Primary Examiner

M. KOCZO, JR., Assistant Examiner

U.S. Cl. X.R.

30—90.4; 81—9.5